(12) United States Patent
Schumacher

(10) Patent No.: US 6,202,692 B1
(45) Date of Patent: Mar. 20, 2001

(54) DEVICE FOR COUPLING HYDRAULIC LINES

(76) Inventor: Gustav Schumacher, Gartenstrasse 8, D-57612 Eichelhardt (DE)

( * ) Notice: Subject to any disclaimer, the term of this patent is extended or adjusted under 35 U.S.C. 154(b) by 0 days.

(21) Appl. No.: 09/539,176

(22) Filed: Mar. 30, 2000

(30) Foreign Application Priority Data

Mar. 30, 1999 (DE) .............................. 199 14 318

(51) Int. Cl.[7] .................................. F16L 29/00
(52) U.S. Cl. ................. 137/614.06; 137/614.04
(58) Field of Search ............... 137/614.06, 614.05, 137/614.04, 614.03, 614

(56) References Cited

U.S. PATENT DOCUMENTS

| | | | |
|---|---|---|---|
| 3,693,655 | * 9/1972 | Frisk | 137/614.06 X |
| 4,181,150 | * 1/1980 | Maldavs | 137/614.06 |
| 4,222,411 | * 9/1980 | Herzan et al. | 137/614.06 X |
| 4,672,998 | 6/1987 | Kozak, III . | |
| 5,095,947 | * 3/1992 | Weh et al. | 137/614.06 |
| 5,316,033 | 5/1994 | Schumacher et al. . | |

FOREIGN PATENT DOCUMENTS

| | | |
|---|---|---|
| 4318840 C2 | 9/1994 | (DE) . |
| 19647936 A1 | 5/1997 | (DE) . |

* cited by examiner

*Primary Examiner*—Kevin Lee
(74) *Attorney, Agent, or Firm*—Harness, Dickey & Pierce, P.L.C.

(57) ABSTRACT

A device for connecting hydraulic lines to a second coupling muff (11) has a connector socket (13) to receive and fix a first hydraulic connector (24). The first hydraulic connector (24) has a first connector valve. The coupling muff (11) has a muff valve (12), and an actuating lever. The lever transfers the first muff valve (14) and the first connector valve into the open position when the first hydraulic connector (24) is fixed in the connector socket (13). A second hydraulic connector (27) is connected to an end of the coupling muff (11) remote from the connector socket (13). This device serves to connect a coupling muff, which is connected to a pressure source, to a hydraulic connector on the side of the load, even if the load side is pressurized in the disconnected state. The device is interconnected when such a load exists.

7 Claims, 3 Drawing Sheets

DEVICE FOR COUPLING HYDRAULIC LINES

CROSS-REFERENCE TO RELATED APPLICATION

This application is based upon and claims priority to German Patent Application 199 14 318.8 filed Mar. 30, 1999, which application is herein expressly incorporated by reference.

BACKGROUND OF THE INVENTION

The invention relates to a coupling valve for hydraulic lines.

Devices for coupling hydraulic lines are used, for example, in vehicles such as tractors, to provide a hydraulic connection between a hydraulic drive of an attached implement and a pressure means source on the side of the vehicle. Generally, to carry this out, several coupling muffs are provided on the side of the vehicle. The muffs are arranged at a small distance to each other at the rear of a tractor due to space limitations. Such coupling muffs are standardized and are formed to couple hydraulic connectors. The connectors are also standardized with respect to their dimensions by ISO 5675. The coupling muffs are provided as quick-connection muffs, but also can be formed as threadable muffs.

To insert, for example, a hydraulic connector, arranged at one end of a hydraulic hose, which leads to the implement-side hydraulic user into the vehicle-side hydraulic muff, opening of the coupling muff-sided as well as the hydraulic connector-sided valves is carried out, to provide a hydraulic connection. There are implements, in which the implement-side hydraulic devices still are under pressure after separation from the vehicle-side hydraulic supply. Thus, the coupling-in of the hydraulic connector by hand is nearly impossible even when the vehicle-side hydraulic supply is switched to a non-pressurized state. While coupling-in the projections of the cone valves of the muff and of the hydraulic connector abut each other and with further axial movement of the coupling muff and the hydraulic connector are displaced deeper into them, so that both valves are opened.

U.S. Pat. No. 4,672,998 relates to a connection arrangement with a coupling connector and a coupling muff, each having a valve. The coupling connector and the coupling muff are connected to each other by a rotary joint. In order to protect against damage, easy adjustment of the parts relative to the connected hose should be possible. Furthermore, while connecting the tools, the handling of the tools should be made easier by the larger space of movement. The opening of the respective valves takes place during the coupling-in process. If the system is pressurized, the coupling-in process takes place against the system pressure in this embodiment to provide the above described disadvantages.

Furthermore, coupling muffs are known, in which first the connecting process between the hydraulic connector and the coupling muff is carried out. Next, the opening of the connector valve is carried out by means of opening the muff valve by means of an actuating mechanism, which comprises an actuating lever. Such coupling muffs are described in DE 43 18 840 C2 or in U.S. Pat. No. 5,316,033, the specifications of which are incorporated by reference herein. Such switchable coupling muffs have, compared to the above described couplings, where the coupling-in takes place at the same time as the opening of the connector valve and of the muff valve, the advantage, that the valves will be opened by operating a lever by hand after having carried out the coupling process. Accordingly, coupling muffs and hydraulic connectors, which are under pressure, can be connected and their valves easily opened.

Because of the limited available space in vehicles, especially in tractors, normal coupling muffs can often not be replaced in general. Furthermore, in some implements the hydraulic connectors and the normal coupling muffs are easily coupled as they are not under pressure.

DE 196 47 936 A1 describes a fittings set for emptying, filling and/or airing of water parts of heating devices, e.g. gas boilers. Besides a manometer, a hand locking valve or such are connectable into a hose line by means of quick couplings (quick release couplings).

SUMMARY OF THE INVENTION

The present invention provides a device for coupling a hydraulic line. The invention enables, from case to case, use of a coupling muff, which allows an additional later connecting without changes to the existing coupling muffs of a customary design. Also, the invention enables easy coupling of systems, which are under pressure, and which device is held securely after connecting.

The invention provides a device for coupling hydraulic lines and comprises a coupling muff, with a connector socket to receive and fix a first hydraulic connector. The first hydraulic connector has a first connector valve. The coupling muff has a muff valve, and a hand actuating means. The muff valve and the first connector valve of the first hydraulic connector, via the hand actuating means, are transferred into an open position or a closed position, with the first hydraulic connector inserted in the connector socket. The device further comprises a second hydraulic connector. The second hydraulic connector is connected to an end of the coupling muff removed from the connector socket. The coupling muff and the second hydraulic connector form a unit. A mechanism fixing the unit to a first coupling muff is assigned to the second hydraulic connector. The mechanism includes a thread arranged on the second hydraulic connector and a nut adjustable thereon. The nut comprises a sleeve portion and is tensionable against a part of the first coupling muff.

The coupling muff according to the invention carries out the function of the normal coupling muff attached to the vehicle. Thus, hydraulic connectors can be coupled, which are under pressure. Only after finishing the coupling process can the opening of the first connector valve as well as of the second muff valve take place by operating the hand actuating means. The nut can be threaded with the front face of its sleeve portion against the front face of the housing. Thus, the device is tensioned against the housing and can be fixed secured. Devices according to the invention can be used, where the hydraulic drive of an implement can be coupled with the vehicle-side hydraulic power source and where pressure in the system is maintained, when the hydraulic connection is separated. The unit with the coupling muff with actuating means and the second hydraulic connector can be selectively used in a vehicle having standardized coupling muffs. Furthermore, the second coupling muff, which is fixed to the respective vehicle serves, at the same time, as the support for the device according to the invention. The device according to the invention can be used in a vehicle or a machine without any changes. The coupling can also take place with quick release muffs, which are attached to the vehicle, or with screwed fittings. Mainly the device will be used with internationally standardized and well known quick release muffs, which are used for coupling connectors according to ISO-Norm 5675. The principle is also applicable to other types of coupling muffs and connectors provided at a vehicle or machine.

In a first embodiment, the second hydraulic connector is directly connected to the housing of the coupling muff. For other applications it is possible for a better utilization of the space to arrange the second hydraulic connector with an off-set to the coupling muff. To achieve an offset, an intermediate housing may be provided. The intermediate housing is fixed in the housing of the coupling muff. Also, the intermediate housing carries the second hydraulic connector.

It is alternatively possible to connect the second hydraulic connector to the coupling muff by a pipe or a hose line. In such an embodiment, the coupling muff can be fixed to an empty space of the implement or of the vehicle, respectively. By means of the hose line the corresponding second hydraulic connector can be inserted into one of the second coupling muffs, which are provided at the rear of the tractor. It is also possible that the second coupling connector forms a unit with the coupling muff. Furthermore, it can be threaded to the second coupling muff.

From the following detailed description, taken in conjunction with the drawings and subjoined claims, other objects and advantages of the present invention will become apparent to those skilled in the art.

BRIEF DESCRIPTION OF THE DRAWINGS

Three embodiments of the present invention are shown schematically in the drawings.

DETAILED DESCRIPTION OF THE PREFERRED EMBODIMENT

Figure 1:
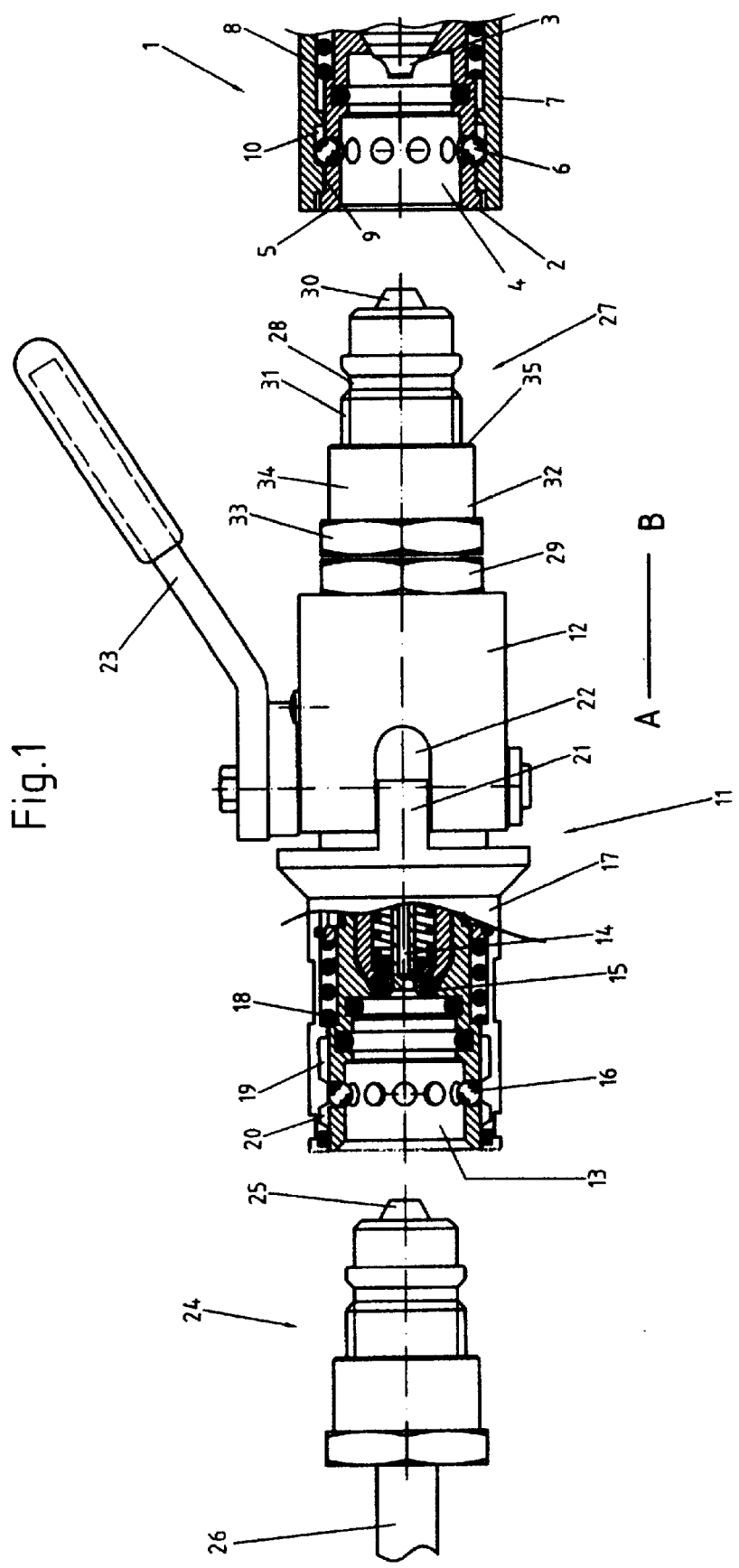
FIG. 1 is an elevation view partially in section of a first embodiment of a device according to the invention.

FIG. 1 shows part of a customary second coupling muff 1. The coupling muff 1 receives a standardized hydraulic connector and is, for example, arranged at the rear end of a tractor. The second coupling muff 1 has a housing 2. A second muff valve body 3 is slidable supported in the housing 2. Furthermore, the housing 2 has a receiving chamber 4 to receive a connector. The housing 2 has a front face 5 and the receiving chamber 4 starts from the front face 5. Locking balls 6 are radially adjustably supported in radial openings of the housing 2. The balls 6 are held by a locking face 9 of a first locking sleeve 7. The first locking sleeve 7 is arranged coaxially and axially adjustable relative to the housing 2 in a longitudinal direction. The second locking sleeve 7 is acted upon by a spring 8. The spring 8 urges the second locking sleeve 7 to its blocking position. FIG. 1 shows the second locking sleeve 7 in its open position. The locking balls 6 radially outwardly enter a groove 10, so that a hydraulic connector can be coupled.

The device according to the invention includes a coupling muff 11, which has a housing 12. The housing 12 has a connector socket 13 for coupling a hydraulic connector. Furthermore, it has a muff valve 14, whose muff valve body 15 is transferable into an open position actuated by a force. Locking balls 16 are shiftable in radial bores of the housing 12. A locking sleeve 17 is adjustable on the housing 12 in the direction of the longitudinal axis. The locking sleeve 17 is urged towards the locking position by a locking spring 18 to lock the balls 16. A locking face 20 of the locking sleeve 17 covers the locking balls 16. In this position, an inserted hydraulic connector would be fixed in position. These balls cannot move radially outwardly. To open the locking sleeve 17, the locking sleeve is displaced against the force of the locking spring 18. Accordingly, the locking balls 16 may radially outwardly enter into the releasing groove 19. The locking sleeve 17 has a lug 21 which engages a groove 22 of the housing 12 to ensure that the locking sleeve 17 cannot be rotationally displaced relative to the housing 12. An actuating lever 23 actuates, via a disc cam, a muff valve body 15. The lever 23 transfers the valve body 15 into the open position, as described in U.S. Pat. No. 5,316,033 or DE 43 18 840 C2.

A first hydraulic connector 24 is shown. A first connector valve body 25 protrudes from the housing of the first hydraulic connector 24. The first hydraulic connector 24 is, for example, connected to a load by a hydraulic hose 26. The hose may be provided on the side of an implement. The first hydraulic connector 24 can be connected to the coupling muff 11. Here, the first hydraulic connector 24 is inserted into the connector socket 13 and locked by the locking balls 16 and the locking sleeve 17. Only after this can the muff valve 14 and the valve of the first hydraulic connector 24 be opened by moving the first connector valve body 25 into the open position.

A second hydraulic connector 27 is connected to the coupling muff 11. A connector housing 28 is provided with a hexagonal spanner face 29 and a threaded connection is part of the second hydraulic connector 27. The housing 28 is threaded into the housing 12 via the threaded connection. The second hydraulic connector 27 has a connector valve body 30. A thread 31 is arranged on the outer surface of the connector housing 28. A nut 32 is arranged on the thread 31. The nut 32 has a hexagonal spanner face 33 and a sleeve portion 34. The sleeve portion 34 includes front face 35. The second hydraulic connector 27 can be connected to the second coupling muff 1. To fix the unit, including the second coupling muff 11 and the second hydraulic connector, to the second coupling muff 1, the nut 32 is adjusted such that its front face 35 is forced against the front face 5 of the housing 2.

In operation, the unit, including the coupling muff 11 and the second hydraulic connector 27, is connected to the second coupling muff 1. Afterwards, the first hydraulic connector 24 is connected to the coupling muff 11. The opening of the valves, the muff valve 14 and the first connector valve body, is carried out afterwards by the actuating lever 23.

Figure 2:
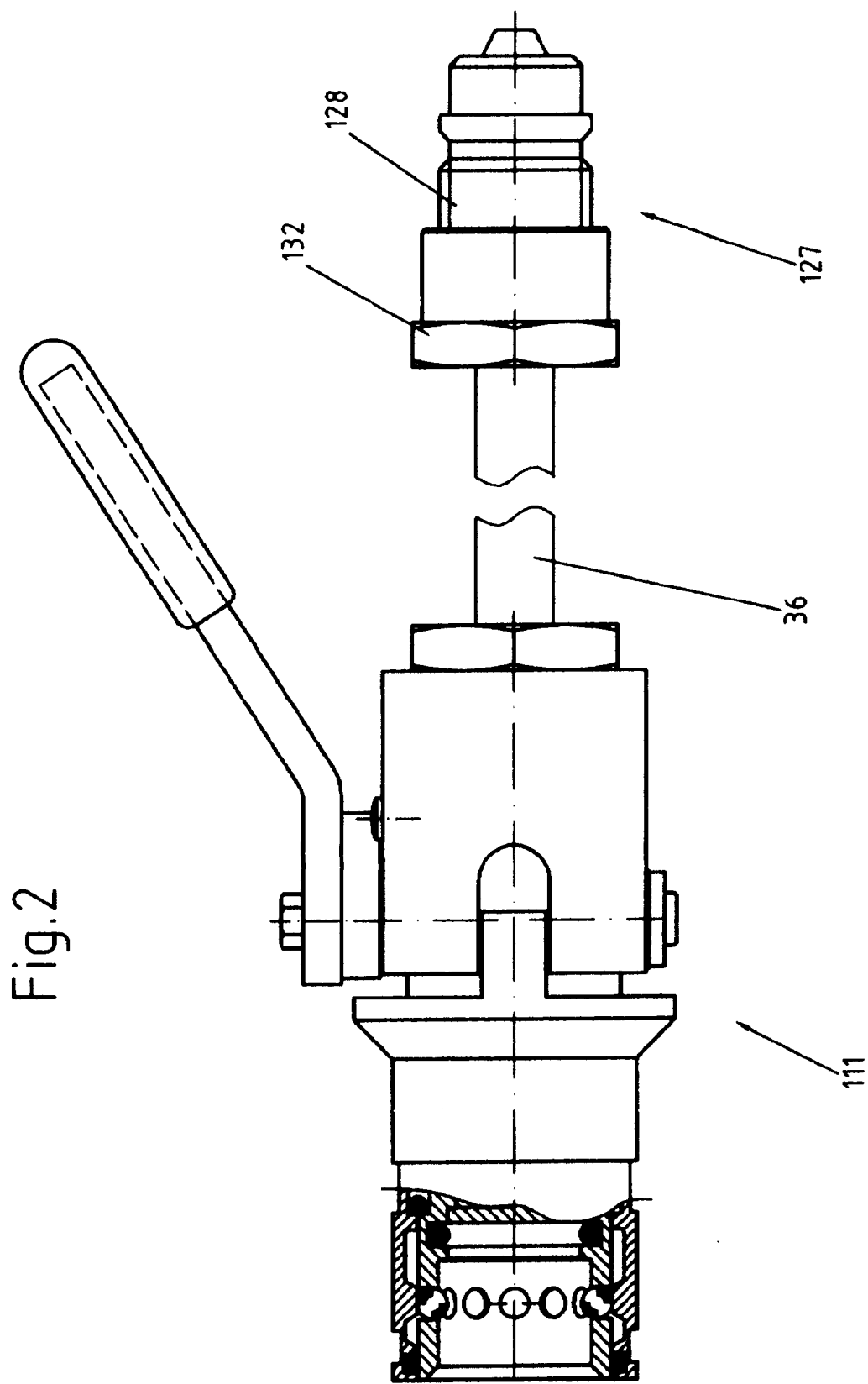
FIG. 2 is an elevation view partially in section of a second embodiment of the device according to the invention.

FIG. 2 shows another embodiment. The coupling muff 111 corresponds to the coupling muff 11 according to FIG. 1. The second hydraulic connector 127 corresponds to the hydraulic connector 27 of FIG. 1. The second hydraulic connector 127 is connected to the housing of the coupling muff 111 by an interpositioned line, for example a hydraulic hose 36. The second hydraulic connector 127 includes a nut 132. The design and the arrangement of the nut 132 on the connector housing 128 correspond to that of FIG. 1.

Figure 3:
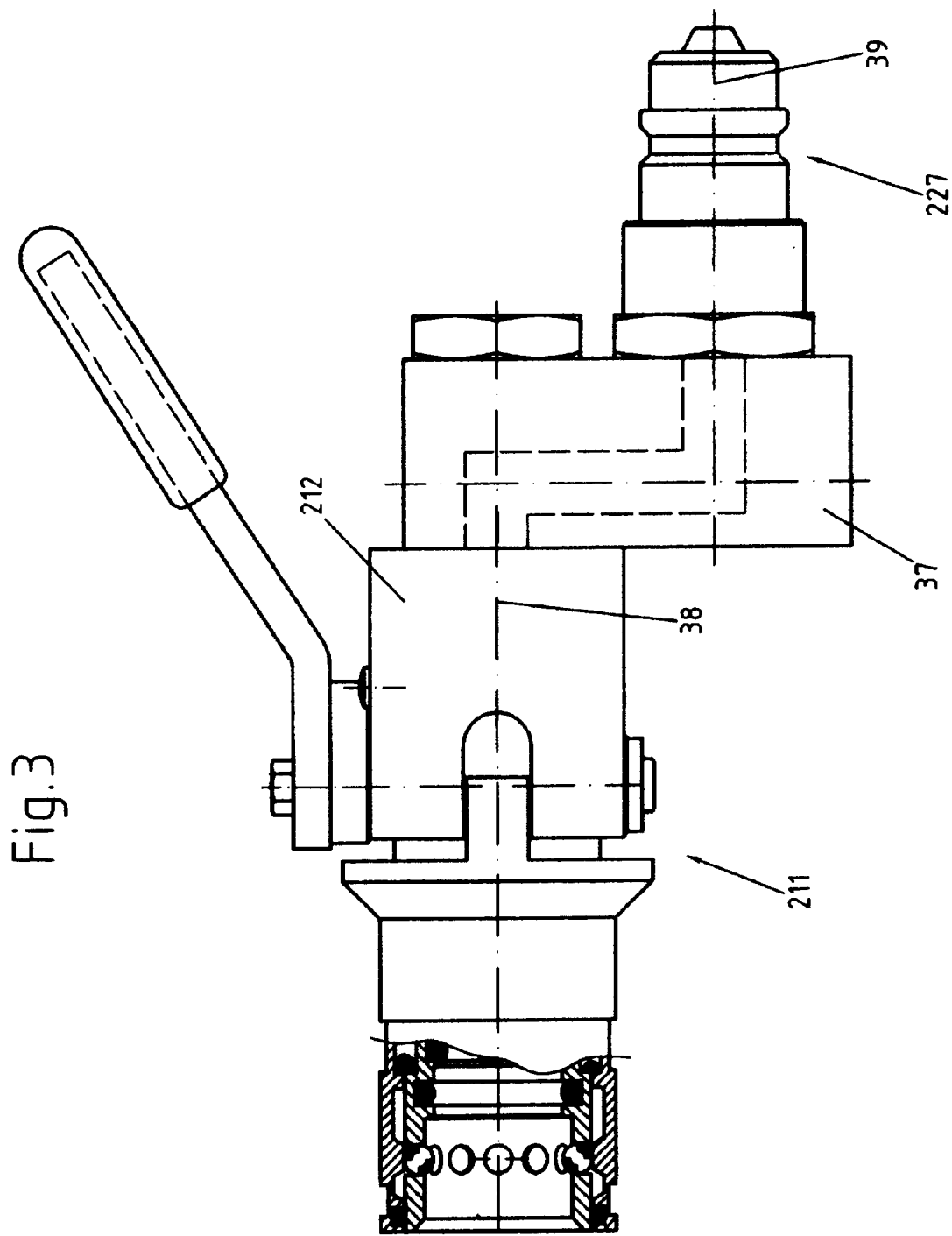
FIG. 3 is an elevation view partially in section of a third embodiment where the hydraulic connector is arranged with an offset to the second coupling muff.

FIG. 3 shows another embodiment. Here, an intermediate housing 37 is connected to the end of the coupling muff 211. The coupling muff 211 corresponds to the coupling muff of FIG. 1. The coupling muff 211 supports the second hydraulic connector 227. Moreover an arrangement is chosen in such a way that the first longitudinal axis 38 of the coupling muff 211 and the second longitudinal axis 39 of the second hydraulic connector 227 are offset. The intermediate housing 37 is connected to the end of the housing 212. This embodiment offers an offset arrangement, to provide more space for the attachment of the unit, which includes the coupling muff 211 and the second hydraulic connector 227.

While the above detailed description describes the preferred embodiment of the present invention, the invention is susceptible to modification, variation and alteration without deviating from the scope and fair meaning of the subjoined claims.

What is claimed is:

1. A device for coupling hydraulic lines, comprising:

a coupling muff having a connector socket removably coupled with a first hydraulic connector, said first hydraulic connector having a first connector valve, said coupling muff having a first muff valve and hand actuating means, said muff valve and said first connector valve of said first hydraulic connector being transferable into an open position or closed position by the hand actuating means, with the first hydraulic connector inserted in the connector socket;

a second hydraulic connector connected to an end of the coupling muff remote from the connector socket, said coupling muff and said second hydraulic connector form a unit; and fixing mechanism for fixing said unit to a second coupling muff via said second hydraulic connector, said fixing mechanism including a thread arranged on the second hydraulic connector and a nut adjustable thereon, said nut including a sleeve portion being tensionable against a part of the second coupling muff.

2. The device according to claim 1, wherein the second hydraulic connector is connected directly to a housing of the coupling muff.

3. The device according to claim 1, wherein the second hydraulic connector is arranged with an offset to the coupling muff.

4. The device according to claim 3, wherein the second hydraulic connector is connected to the housing of the coupling muff by an intermediate housing.

5. The device according to claim 1, wherein the second hydraulic connector is connected to the coupling muff by a pipe or hose line.

6. The device according to claim 2, wherein the second hydraulic connector forms a unit with the coupling muff.

7. The device according to claim 2, wherein the second hydraulic connector is threadable onto the coupling muff.

\* \* \* \* \*